(12) United States Patent
Kuo et al.

(10) Patent No.: US 6,940,678 B2
(45) Date of Patent: Sep. 6, 2005

(54) MAGNETIC ALIGNMENT MARKING OF HARD DISKS

(75) Inventors: David S. Kuo, Palo Alto, CA (US); Jason Pressesky, Menlo Park, CA (US); Dan Nguyen, San Jose, CA (US)

(73) Assignee: Seagate Technology LLC, Scotts Valley, CA (US)

( * ) Notice: Subject to any disclaimer, the term of this patent is extended or adjusted under 35 U.S.C. 154(b) by 269 days.

(21) Appl. No.: 10/340,283

(22) Filed: Jan. 10, 2003

(65) Prior Publication Data

US 2003/0193735 A1 Oct. 16, 2003

Related U.S. Application Data

(60) Provisional application No. 60/371,953, filed on Apr. 10, 2002.

(51) Int. Cl.[7] ............................................. G11B 5/596
(52) U.S. Cl. .................................................. 360/77.03
(58) Field of Search .............................. 360/77.03, 75, 360/58, 66, 78.08, 98.08, 99.12, 135, 17

(56) References Cited

U.S. PATENT DOCUMENTS

| | | | | |
|---|---|---|---|---|
| 4,371,902 A | * | 2/1983 | Baxter et al. ................. | 360/75 |
| 5,136,450 A | * | 8/1992 | Moir .......................... | 360/135 |
| 5,781,374 A | * | 7/1998 | Moir et al. ............... | 360/99.12 |
| 5,963,029 A | | 10/1999 | Pressesky | |
| 6,081,990 A | * | 7/2000 | Kuroba et al. ........... | 29/603.01 |
| 6,212,031 B1 | * | 4/2001 | Kazmierczak et al. ... | 360/98.08 |
| 6,236,536 B1 | * | 5/2001 | Ma et al. .................. | 360/99.08 |
| 6,317,285 B1 | * | 11/2001 | Bi et al. ....................... | 360/75 |
| 6,359,747 B1 | | 3/2002 | Kuo | |
| 6,411,459 B1 | * | 6/2002 | Belser et al. ................. | 360/75 |
| 6,522,494 B1 | * | 2/2003 | Magee ........................ | 360/75 |
| 6,538,836 B1 | * | 3/2003 | Dunfield et al. .............. | 360/75 |
| 6,738,205 B1 | * | 5/2004 | Moran et al. ................. | 360/17 |
| 6,765,744 B2 | * | 7/2004 | Gomez et al. ................ | 360/75 |

FOREIGN PATENT DOCUMENTS

| | | |
|---|---|---|
| EP | 0 327 207 A2 | 8/1989 |
| EP | 0 368 269 A2 | 5/1990 |
| EP | 0 327 207 B1 | 7/1993 |
| EP | 0 368 269 B1 | 1/1995 |

* cited by examiner

*Primary Examiner*—David Hudspeth
*Assistant Examiner*—Fred F. Tzeng

(57) ABSTRACT

Magnetic alignment marks are recorded on a recording surface of a magnetic hard disk to mark the location where the disk is abutted against the hub of the spindle of a multiple-disk servo-writer. The alignment marks for each recording surface may be different so as to distinguish between top and bottom disk surfaces so that when the discs are assembled onto the spindle of a disk drive they may be assembled with the proper orientation, i.e., the top surface is mounted "up." The marks may be large, low frequency patterns that are both written and detected by non contact means other than the servo-track writer's or the disk drive's heads.

20 Claims, 4 Drawing Sheets

MAGNETIC ALIGNMENT MARKING OF HARD DISKS

CROSS-REFERENCE TO RELATED APPLICATIONS

This application claims benefit of U.S. provisional patent application Ser. No. 60/371,953, filed on Apr. 10, 2002, which is hereby incorporated by reference.

BACKGROUND OF THE INVENTION

1. Field of the Invention

The invention relates to field of disk drives and more particularly to methods for writing servo tracks on magnetic hard disks.

2. Description of the Related Art

Hard disk drives provide prerecorded tracking servo information on the data recording surfaces of their magnetic hard disks. This servo information typically comprises servo bursts spaced evenly along tracks. Data is recorded between the servo bursts. In most cases, servo bursts are radially aligned. This radial alignment makes them look like the spokes of the wheel. When the servo bursts are prerecorded by a linear actuator, the spokes are perfectly straight and follow a radius drawn from approximately the disk's inner diameter to the disk's circumference. If the bursts are written by a rotary actuator, the servo bursts follow the arc of the rotary actuator.

During operation, the disk drive magnetic read/write head flies over the spinning disks and reads information from the tracks as the information passes beneath the head. This information includes both data and servo information recorded in the evenly spaced servo bursts. The servo information tells the disk drive servo system where the head is in relation to the track in order that the disk drive servo system may adjust the head's radial position to keep the head on track center.

The servo bursts may be written onto a disk's surface using a variety of techniques. The most common method is to write the servo onto the disk using the disk drive's own magnetic head controlled typically by an externally introduced picker that grasps the drive's rotary actuator arm upon which the read/write head is mounted. An external mechanism incrementally moves the arm while other circuits command the disk drive to write the servo bursts.

Another common servo-writing method comprises writing servo bursts onto the disks already assembled onto the disk drive spindle but prior to the disk drive spindle/disk combination, also known as a hub/disk assembly ("HDA"), being assembled into the disk drive itself.

A newer approach mounts a large number of disks onto a spinstand and writes the servo bursts onto all of them at the same time. This approach, also known as "multiple disk write" ("MDW") saves money due to the number of disks that are written at the same time. However, this approach also introduces a number of problems due to the fact that the disks themselves are not assembled onto the disk drive spindle at the time servo tracks are written.

One of the problems is that the disk must be mounted onto the drive spindle in the same "orientation" it was written. For example, if the servo tracks were written by a rotary actuator, the servo burst will be arrayed in a arc that follows the arc of the servo-track writer. In order to read such servo bursts properly, the disk drive's actuator must be aligned to traverse the same arc as the servo track writer. In order that this occur, the disks must be mounted in the same orientation vis-à-vis the disk drive's actuator they were vis-à-vis the servo track writer's actuator. In most cases this is accomplished by assuring that a disk's "top" surface when it is mounted in the servo track writer also be the "top" surface when that same disk is mounted in the disk drive.

A second problem occurs when two (or more) such prerecorded MDW disks are mounted in a single disk drive. Not only must the arcs of both disks be aligned, but also the tracks themselves should be substantially aligned vertically, that is, the tracks of one disk must be substantially congruent with tracks of the other disks such that they form "aligned" cylinders. In this manner, the disk drive can switch between a head reading, for example, track 1000 on the top surface of the topmost disk, to a head reading track 1000 of the top surface of the next disk in the stack without needing to perform a seek. If the respective tracks were significantly misaligned in some fashion, switching between them without performing a seek or some other alignment technique would not be possible. The first thing the drive would need to do after head switch would be to find out its location. This may even require it to seek a track "0" in order to recover a proper track number.

A third problem caused by writing servo data while the disk is mounted on a different spindle is track eccentricity. A hard disk's inner diameter has a tolerance specification much higher than the track eccentricity specification of most disk drive servo systems. If the disk is mounted on the disk drive's spindle in a manner that is significantly off center from the way it was written on the servo writer, it will exceed the drive's servo system eccentricity tolerance. While most disk drive servo systems have eccentricity feed forward mechanisms to help increase their eccentricity tolerances, these feed forward systems have stroke limits far below the highest tolerances for hard disk inner diameters.

Another problem is the angular alignment of the servo spokes from one disk to another. If the angular misalignment is too large, the drive cannot reliably switch heads from one disk surface to another located on a second disk.

A current practice for achieving such alignment is to bias all the disks in the MDW servo-writer against the servo-writer's spindle hub so that each of the disks' inner diameters are vertically aligned at the point of contact with the servo track writer's hub. Thereafter, when these disks are assembled onto the disk drive's spindle, alignment of their inner diameter's contact points that abut against the disk drive spindle hub causes them to have the same vertical alignment they had in the MDW servo track writer. Depending on the precision of alignment of the disks in both the MDW servo track writer and in the disk drive, and upon the precision that the respective servo bursts are written by the MDW servo track writer, the alignment of the inner diameter contact points automatically congruently aligns the tracks of respective disks into the same cylinders they had on the servo-track writer.

The conventional way to align the disks onto both the servo-track writer and disk drive spindles so that the same portion of the disk inner diameter contacts each is to mark the disks with a laser prior to their being loaded onto the MDW servo track writer. The human operator or robot that mounts the disks onto the MDW servo track writer optically inspects the mark and places the disks onto the hub with the mark, for example, being at point where the disk inner diameter abuts the servo track writer hub. The same is done when the disks are mounted on the disk drive hub.

However the use of a laser marking tool presents several problems. The laser marking tools are expensive and bulky.

They require substantial clean room space. Different tools are required to mark glass and nickel phosphorus/aluminum substrates. Finally the use of a laser marking tool adversely affects effects drive reliability in a number of ways. The large topographic relief of the marks at the disk inner-diameter can lead head crashes. In addition, the rough topography can lead to the debris generation which can also lead to head crashes.

Thus there is a need to permit multiple disk writers to write the servo bursts of a large number of disks at the same time while not using lasers to mark the disks.

SUMMARY OF THE INVENTION

The invention comprises magnetically recording alignment marks on a magnetic hard disk. The mark comprises a pattern that is not erased by the subsequent writing of servo data. The pattern's location has a defined relationship to the location where the hard disk's inner diameter abutted against a servo-writer's spindle hub during servo-write of the surface. When this disk is mounted onto the spindle of a disk drive, the magnetic alignment mark is sensed. Due to the defined relationship of the alignment mark to the inner diameter abutment location, the disc is caused to abut against the disk drive spindle hub at the same disk inner diameter location that abutted against the spindle writer's hub.

The pattern may consist of a pattern that distinguishes a disk's top surface from its bottom surface. The preferred pattern consists of a plurality of narrow and wide magnetic marks.

The marks may be written and sensed by means other than the servo-writer's head or the disk drive's head. In one form, the pattern is both written and sensed by a "fixed" electro-magnet. In another form the patterns are "printed" onto the disk. When the patterns comprise low frequency magnetic marks, they may also be read by "non contact" sensors such Kerr effect sensors, or ring-type inductive replay heads.

DETAILED DESCRIPTION OF THE PREFERRED EMBODIMENTS

Figure 1:
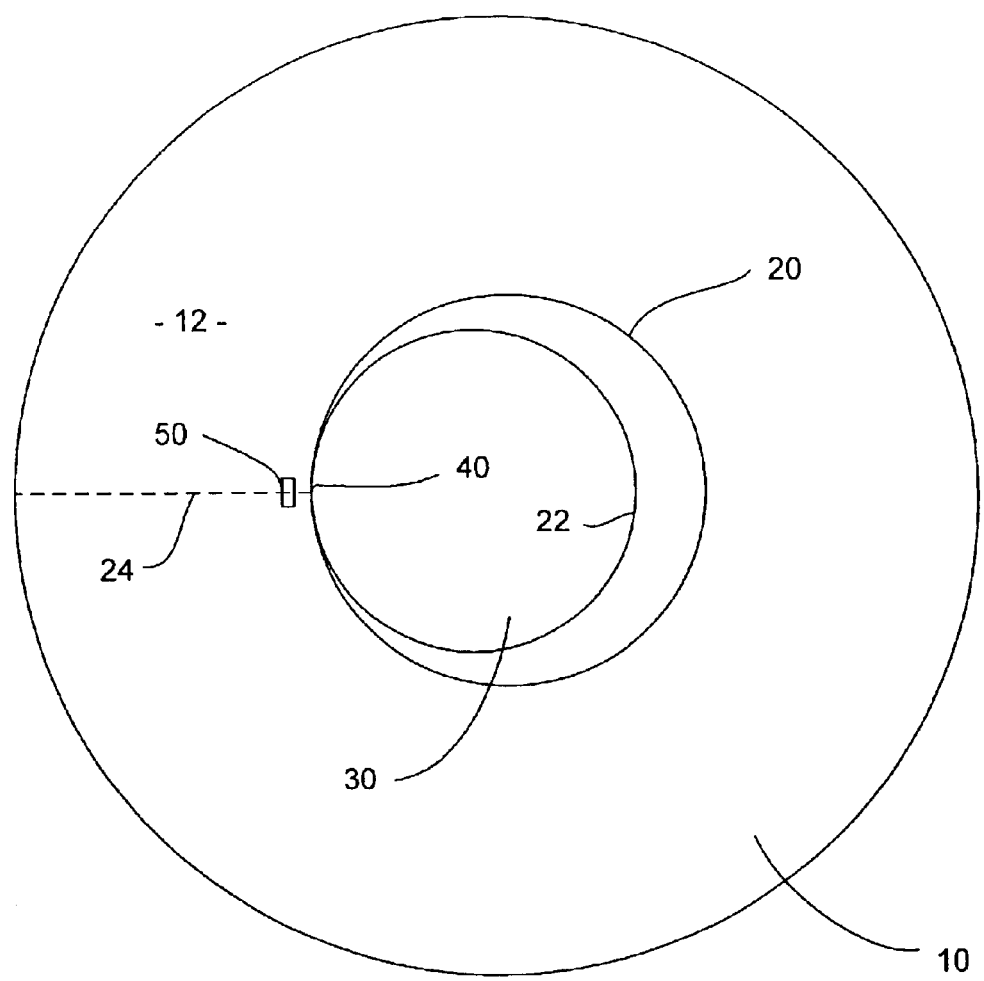
FIG. 1 is an exaggerated top view of a magnetic hard disk shown abutting against the hub of a spindle at the disk's inner-diameter. The figure also shows a magnetic alignment mark located on a radial extending from the point of contact between the disk inner diameter and the spindle hub.

FIG. 1 illustrates, by exaggeration, a magnetic hard disk 10 biased such that it's inner diameter 20 abuts against the hub 22 of spindle 30 at location 40. FIG. 1 further illustrates a magnetic alignment mark 50 located on top surface 12 of the hard disk 10. This magnetic mark is located in a defined relationship to the abutment location 40. As illustrated in the figure, a preferred location for the magnetic alignment mark 50 is near the inner diameter 20 and aligned on a radial 24 that passes through both the alignment mark 50 and abutment location 40. In this manner, the detection of the alignment mark 50 determines the location 40. Appropriate robotic tooling, not shown, may then bias the disk such that the disk inner diameter 20 abuts the spindle hub 22 at location 40.

The same bias and location technique may be used for bias-locating the disk 10 on either a servo track writer's spindle or a disk drive's spindle. For this reason, spindle 30 in the figure refers generically either to a servo track writer spindle or to a disk drive spindle.

A second alignment mark 53 may be written onto the bottom surface (not shown) of the hard disk 10.

Figure 2:
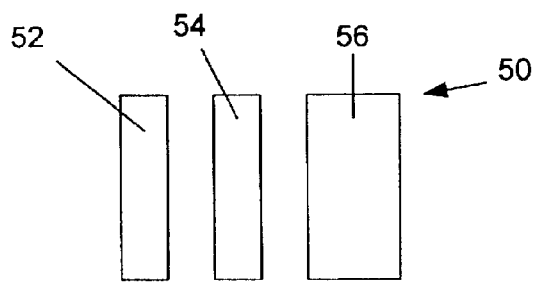
FIG. 2 shows an illustrative pattern of a top surface alignment mark.
Figure 3:
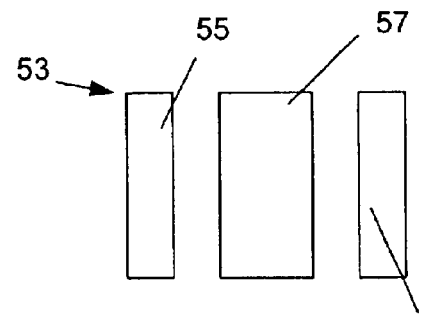
FIG. 3 shows an illustrative pattern of a bottom surface alignment mark.

FIGS. 2 and 3 illustrate a preferred pattern for the alignment marks 50 and 53. The patterns consist of a sequence of narrow and wide marks. The preferred patterns consist of two narrow (52 and 54, and 55 and 57) and one wide mark (56 and 59). Pattern 50 denotes the top surface 12 of the hard disk 10. This pattern consists of two narrow marks 52 and 54 followed by a wide mark 56. Pattern 53 is placed on the bottom surface of disk 10. This pattern consists of a sequence of a narrow mark 55, a wide mark 57, followed by a second narrow mark 59.

When a robot or human operator (not shown) mounts the disk 10 either on the servo writer spindle or on the disk drive spindle hub 30, he must assure that the top surface 12 is mounted facing "up." (The up or down direction here is figurative only. The intent is that the disk have a consistent relationship with the rotary actuators that are used in either a servo track writer or the disk drive itself.) Therefore, a necessary step in reading the magnetic mark 50 or 53 is to determine whether it is a top surface mark or bottom surface mark. Thereafter the disk 10 is oriented properly when in is mounted on spindle 30 so this top surface 12 is facing up and the bottom surface is facing down.

Alignment marks 50 and 53 may be written onto the disk 10 either before the disk 10 is mounted in the servo writer (not shown), or after the disk 10 has been mounted on the servo writer. If the mark is written before the disk is mounted on the servo writer spindle 30, a robot or operator must first orient the disk so that is top surface is up, and then bias the disk so that it's inner diameter abuts against the spindle hub at location 40.

In contrast, if the disk is first mounted on the servo writer spindle 30 before the alignment marks 50 and 53 are written, the operator or robot would only have to bias the disk against the spindle hub at an arbitrary inner diameter location. Thereafter, the alignment marks 50 and 53 are written on the disk in a predefined location in relationship to the abutment location 40. As illustrated in the figure, the predefined relationship is along the radial that runs through inner diameter location 40. The mark 50 may be written anywhere along the radial so long as the mark 50 does not thereafter interfere with the reading and writing of the servo or data either during servo write or during normal disk drive operation. If the mark however can be magnetically erased, it must be written at location away from the servo data so that the writing of the servo data does not destroy the alignment mark. Such a location could be between spaced servo bursts (not shown), or inside or outside the portions of the disk surface in which data is recorded, i.e., either at the inner diameter and OD respectively.

If the alignment marks 50 and 53 can be erased, they may be recorded anywhere on the disk surface where data is recorded, the marks will be erased when data is recorded over them. This may be undesirable if for any reason the drive must be repaired and a disk replaced after the marks are destroyed.

If the alignment marks 50 and 53 are recorded on the disk 10 by the servo writer, no special recording apparatus is needed. The server writer itself would write the alignment marks 50 and 53 at the predefined location. Such marks may be detected later using conventional read/write heads mounted on conventional actuators. Thus a robot or operator detecting such a mark would first mount the disk 10 on a spindle, which could be the disk drive spindle 30, spin the disk up to operating rotational velocity so that the conventional head may "fly," and then detect the mark using a "conventional" head. (Specialized heads may also be used. The may include heads that have Hall devices or unconventional MR or GMR sensors.)

Figure 4:
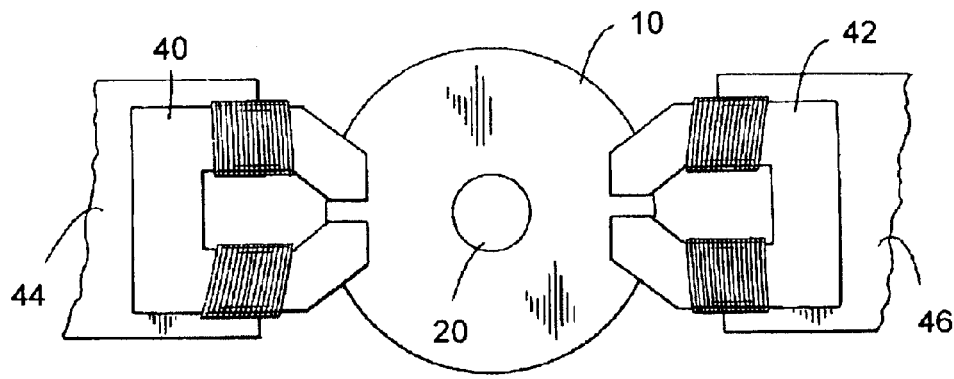
FIG. 4 is a top plan view of a pair electromagnets that read and write large, low frequency marks on the disk.

However other techniques for recording and reading the alignment marks 50 and 53 are contemplated. A first method employs a non contact ring electromagnetic reader and writer as described in U.S. Pat. No. 5,963,029 to Jason Pressesky, which is hereby incorporated by reference. FIG. 4 is taken from FIG. 6 of the '029 patent. In the figure, ring electromagnets 40 and 42 are mounted on linear actuators 44 and 46 respectively. The magnetic disk 10 is mounted for rotation by spinstand (not shown). As the disk spins, one of the electromagnets 40 or 42 is energized to write marks on the disk 10. The other may be used to read the marks.

The electromagnets 40 and 42 are mounted spaced from the disk 10. Because the electromagnets do not float upon the disk surface as the disk rotates, they do not require a high rotational velocity in order to read or write magnetic data from the disk. The electromagnets gap lengths are significantly larger than those of a conventional magnetic head. This results in very large marks being written onto the disk surface. This, combined with a low rotational velocity, can be used to write very large, low frequency marks onto the disk.

A variation on this approach, calls for employing a ring electromagnet, such as 42 or 44, to write the large, low frequency marks. The marks may be detected by conventional magnetic heads that are located either on the servo writer or on the magnetic hard drive to read the alignment marks.

Figure 5:
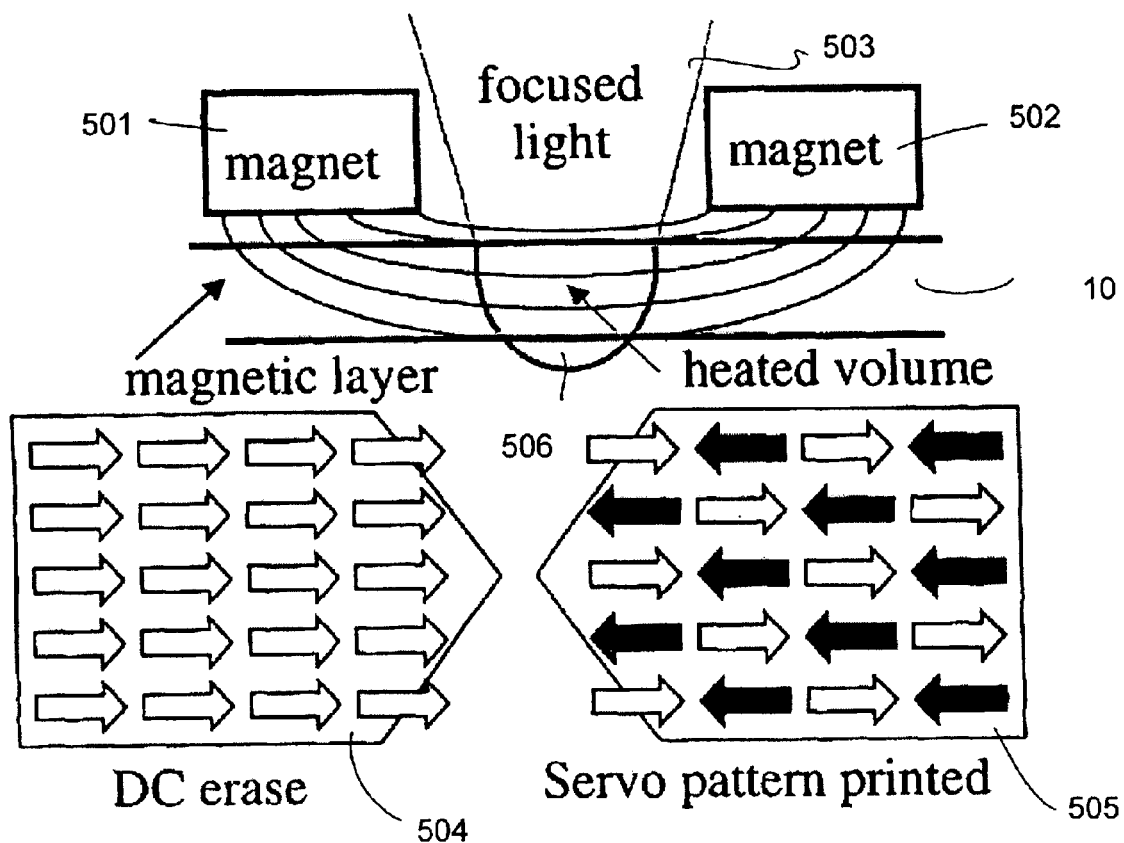
FIG. 5 illustrates a method for photo printing magnetic marks onto a disk.

A second alternative approach would be to form the marks on the disk using a photo printing technique. FIG. 5 illustrates the approach. A pair of electromagnets 501 and 503, which could be similar to the electromagnets 42 and 44 described above, are located adjacent the magnetic disk 10 such that when the disk is rotated beneath the magnets the magnetic field from the magnets causes the disk to magnetize the same direction. As illustrated in box 504, the magnets are first utilized to "DC erase" the disk by causing its magnetization to assume uniform direction. Next a stencil (not shown, but represented by the focused light beam 503) is applied to the disk surface. The stencil's openings correspond to the pattern intended to be written. A light source (not shown) then irradiates the disk through the stencil to focus the light on the exposed areas 503. This heats only the areas 506 exposed by the stencil. The heat causes the coercivity of the magnetic disk to decrease. At this point, the electromagnets are now turned on (they may have been turn on prior to the heating step as well), but with their magnetic fields oriented in the opposite direction from the initial DC erase step. However this time, they are operated to generate a lower magnetic field level. This causes only the heated areas 506, which have a lower coercivity, to switch their magnetic directions to be aligned with the reversed magnetic field from magnets 501 and 502. This results in a pattern 505 of disk magnetization that copies the stencil pattern.

Figure 6:
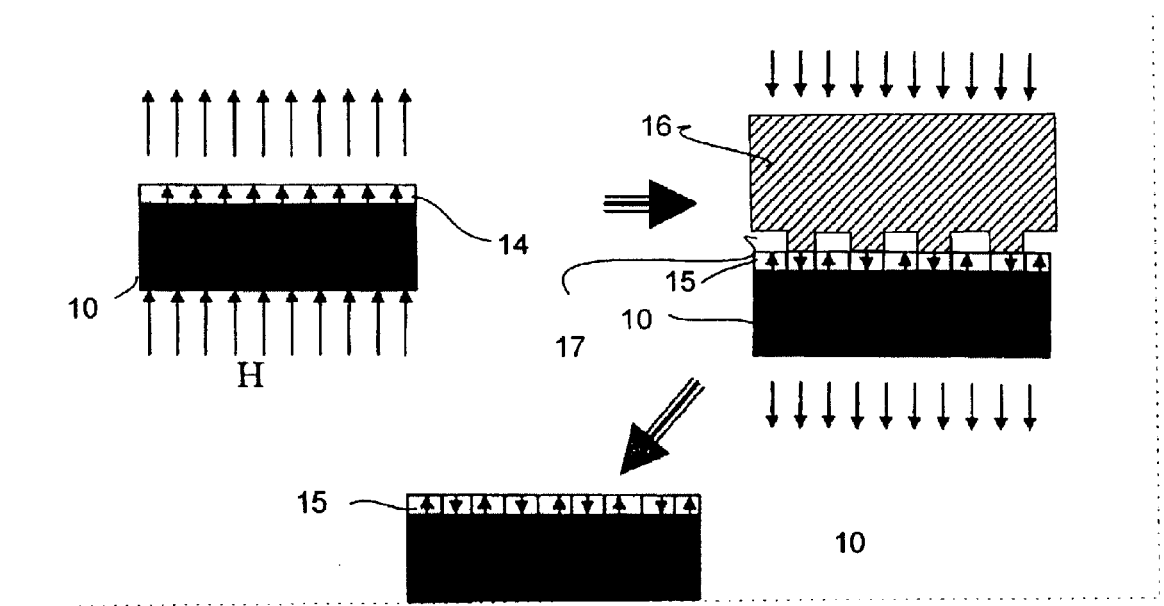
FIG. 6 illustrates a method for recording magnetic marks onto the disk using a high permeability stamper.

Another approach to marking the disk would be the use a high permeability stamper, as illustrated in FIG. 6, to impose a pattern on magnetic media. As illustrated in the top leftmost portion of the figure, the disk is first DC erased using a technique similar that described above. For example, an externally applied field, arrows H in the figure, causes all the magnetic domains 14 of the media to align to a uniform direction as illustrated. Next, a high permeability stamper 16, having the desired pattern 17, is pressed against the disk 10. Then an externally applied field of opposite polarity, illustrated by the now downward arrows, is applied to the disk through the stamper 17. This causes the disk areas in contact with the stamper 17 to switch their magnetic direction to be aligned with the externally applied field. The areas not in contact with the stamper are shielded by the stamper. This causes the disk to assume a reversed magnetic orientation 15 in the pattern of the stamper 17.

Figure 7:
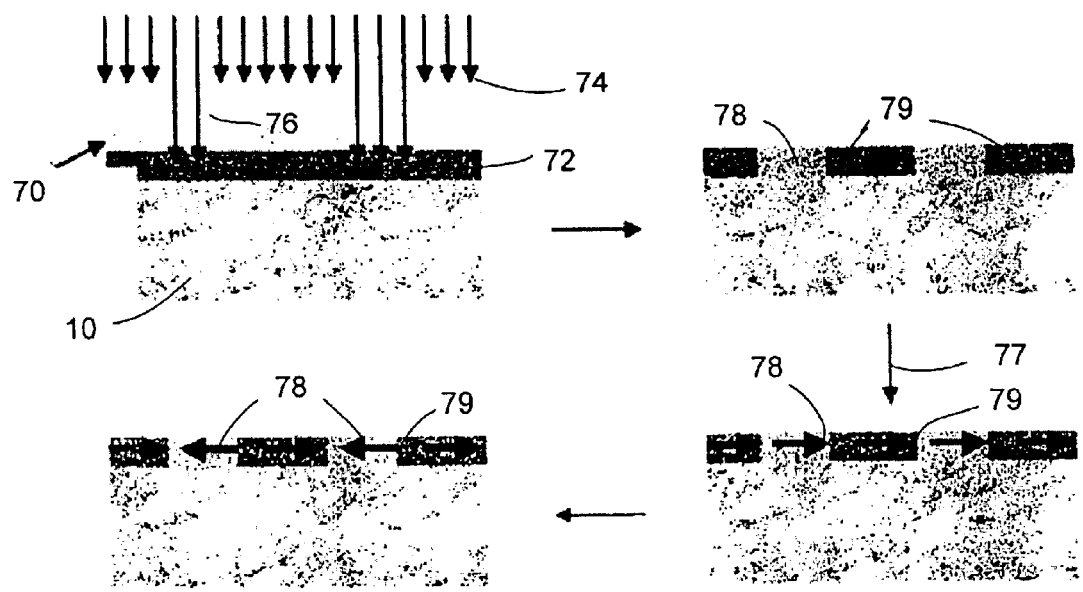
FIG. 7 illustrates a method for recording magnetic marks onto disk using ion implantation to selectively spoil the coercivity of the magnetic disk according to an alignment mark pattern.

Still another alternative method for applying the alignment marks to the disk 10 is illustrated in FIG. 7. As illustrated the figure, ion beams 76 are used to implant non-magnetic material into selective portions of the disk in order to spoil the magnetic properties of those portions. The selection is caused by interposition of a mask 70 that blocks the beam except in areas of the desired pattern. These blocked areas are illustrated by the short arrows 74 in the figure. The exposed areas are illustrated by the longer arrows 76 that reach disk's recording layer 72. Ion implantation creates regions 78 of lower coercivity flanked by regions 79 of higher coercivity.

An externally applied magnetic field 77 of sufficient strength to switch the magnetic directions of both the lower coercivity regions 78 and the higher coercivity regions 79 is now applied. This acts essentially as a DC erase step because it magnetizes the whole recording layer in a uniform direction as illustrated by the rightward facing arrows in the magnetic layer 72. As a final step, the magnetic field 77 is again applied, but this time with an opposite polarity and a lower strength that is sufficient only to switch the regions 78 of lower coercivity. The regions 79 of higher coercivity remain unchanged. This results in a magnetic pattern that may be used to encode an alignment mark 50 or 53.

Preferably, nitrogen ions, N+, or argon ions, Ar+, may be implanted with an energy range between 5 and 25 keV and a dosage range of 0.1% to 1%. Argon ions are more efficient. As the dosage and energy level increases, the disk coercivity level decreases. The degree of coercivity drop depends upon the application. All that is necessary is to encode the marks is that the coercivity be sufficiently different such that the high coercivity regions do not switch during application of the second magnetic field.

It is important to note here that these techniques, except for the use of electromagnet as described in connection with FIG. 4, can be used to write either low-frequency or high frequency patterns. The high frequency patterns can preferably be detected by conventional magnetic heads. These heads, however, may also employ Hall effect sensors, or specific MR or GMR sensors specifically adapted to sense the magnetic marks. The low frequency patterns in contrast can be preferably be detected by non contact means, including electromagnets described above or the optical means described below.

Figure 8:
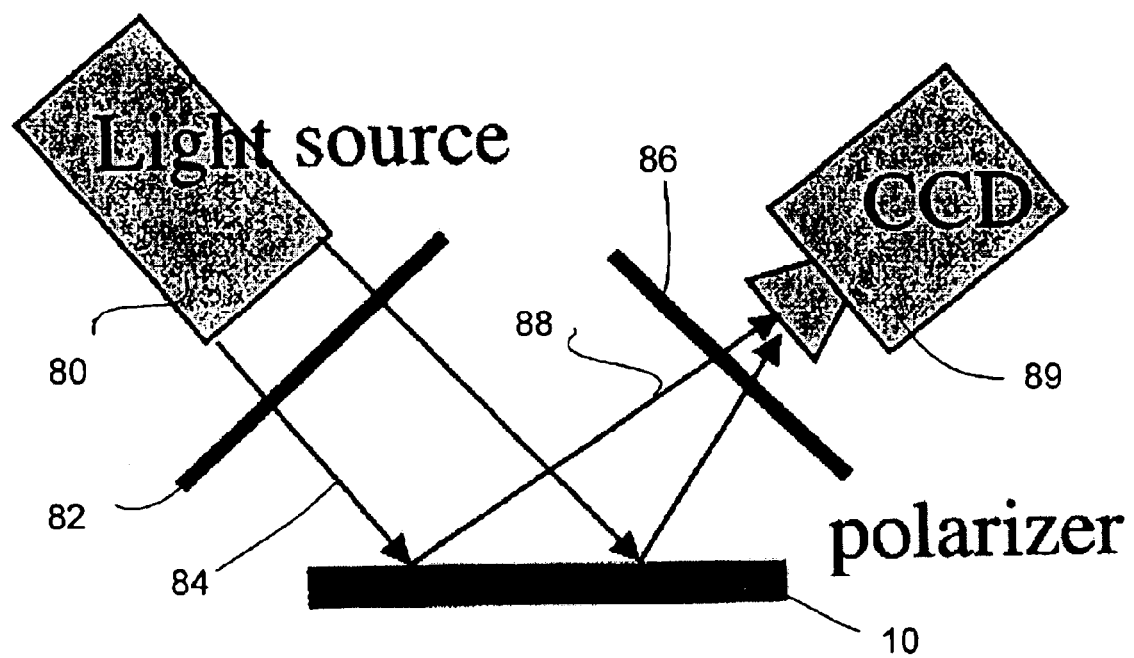
FIG. 8 illustrates apparatus that detects the magnetic orientation of the disk using Kerr rotation.

An alternative detection approach is illustrated in FIG. 8. This approach employs the Kerr rotation of linearly polarized light. A light source 80, such as a red laser, emits a beam of light 84 that passes through a linear polarizer 82. When this light impinges on the magnetic disk 10, its polarization rotates a small amount according to the magnetization of disk. This rotation is caused by what is known as the Kerr effect. The return beam 88 passes through a polarization analyzer 86. The intensity of the return beam 88 passing through the analyzer 86 is detected by a device such as a CCD detector 89. The analyzer 86 may be rotated. The degree of transmission it permits depends upon the polarization of the incident beam. This is used to detect the amount of Kerr rotation caused by the magnetized regions of the disk 10. This, in turn, is determined by the magnetization direction. Thus the magnetic pattern is detected either by passing the disk 10 under the beam or by scanning the beam across the disk.

The above examples of methods of both recording alignment marks onto the disk and detecting are only by way of example. Any technique may be used including techniques that are not yet known.

As well, and not by limitation of the generality thereof, the magnetic alignment marks may be written onto the disk either before or when the disk is mounted on the servo writer. The alignment marks, however cannot be written after the disk has been removed from the servo writer.

Those of ordinary skill may vary the methods for writing and reading alignment marks, their location on a disk surface, and their patterns without varying from the scope of the invention as defined in the appended claims.

We claim:

1. A method of recording alignment marks on a magnetic hard disk, comprising:

magnetically recording an identifiable pattern on at least a first surface of a magnetic hard disk, the location of the pattern corresponding to the inner diameter location of the hard disk inner diameter which abuts against a servo-writer's spindle hub during servo-write of the surface.

2. The method of claim 1 wherein a pattern different from the pattern written on the first surface is written on the second surface of the magnetic hard disk, the location of the second pattern corresponding to the inner diameter location the hard disk inner diameter which abuts against a servo-writer's spindle hub during servo-write of the surface.

3. The method of claim 1, further including:

mounting the magnetic hard disk on a spindle; and biasing the hard disk inner diameter against said spindle such that the inner diameter abuts the spindle at said inner diameter location.

4. The method of claim 3 wherein said spindle is a servowriter spindle.

5. The method of claim 1, further including:

mounting the magnetic hard disk on a hard disk drive spindle; and biasing the hard disk inner diameter against said hard disk drive spindle such that the inner diameter abuts the spindle at said inner diameter.

6. The method of claim 1 wherein the pattern comprises marks recorded on the disk by means of non contact electromagnets.

7. The method of claim 1 wherein the pattern comprises marks recorded on the disk by means of photo printing.

8. The method of claim 1 wherein the pattern comprises marks recorded on the disk by means of a high permeability stamper.

9. The method of claim 1 wherein the pattern comprises marks recorded on selective areas of the disk by means of implanting ions that reduce the disks coercivity.

10. The method of claim 9 wherein the ions are implanted by a beam that passes through a stencil having openings corresponding to the pattern.

11. A method of assembling a hard disk drive, comprising:

mounting a magnetic hard disk having a magnetic alignment mark recorded thereon on a hard disk drive spindle; and biasing the hard disk inner diameter against said hard disk drive spindle such that the inner diameter abuts the spindle at an inner diameter location that has a predefined relationship with said magnetic alignment mark.

12. The method according to claim 11, wherein said predefined relationship comprises the magnetic mark being on a radial connecting the inner diameter location of abutment with the magnetic mark.

13. A method of writing servo patterns on a magnetic hard disc, comprising:

mounting one or more magnetic hard discs on a servo writer spindle hub;

biasing said one or more magnetic hard disks such that their inner diameter abuts the hub at an inner diameter abutment location;

magnetically marking at least one surface of each of said magnetic hard disks with an identifiable pattern at a location on said surface that has a predetermined relationship with said abutment location.

14. The method of claim 13 further including marking the top and bottom surfaces with different magnetic marks.

15. The method of claim 13 further including writing servo patterns on at least one surface of said magnetic hard disk.

16. A magnetic hard disk, comprising:

magnetic hard disk having an inner diameter location that is the point on the inner diameter that was abutting a servo-writer spindle hub when a servo pattern was written on to the disk; and magnetically readable means for marking the location of said abutment location.

17. The magnetic hard disk of claim 16, wherein said magnetic hard disk has two recording surfaces, wherein said magnetically readable means comprises two different patterns, a first pattern on one recording surface and a second pattern on the other recording surface of said magnetic hard disk.

18. The magnetic hard disk of claim 17 wherein each pattern comprises a sequence of marks having a relatively low frequency when compared to a servo pattern.

19. The magnetic hard disk of claim 17 wherein each pattern comprises a pattern of marks substantially larger in size than servo data.

20. The magnetic hard disk of claim 17 wherein the pattern has a size and frequency such that it may be read by non contact magnetic sensors.

* * * * *